Feb. 9, 1932.  E. CLEMENS  1,843,944
ATTACHMENT FOR BUTTON MAKING MACHINES
Filed June 3, 1930   2 Sheets-Sheet 1
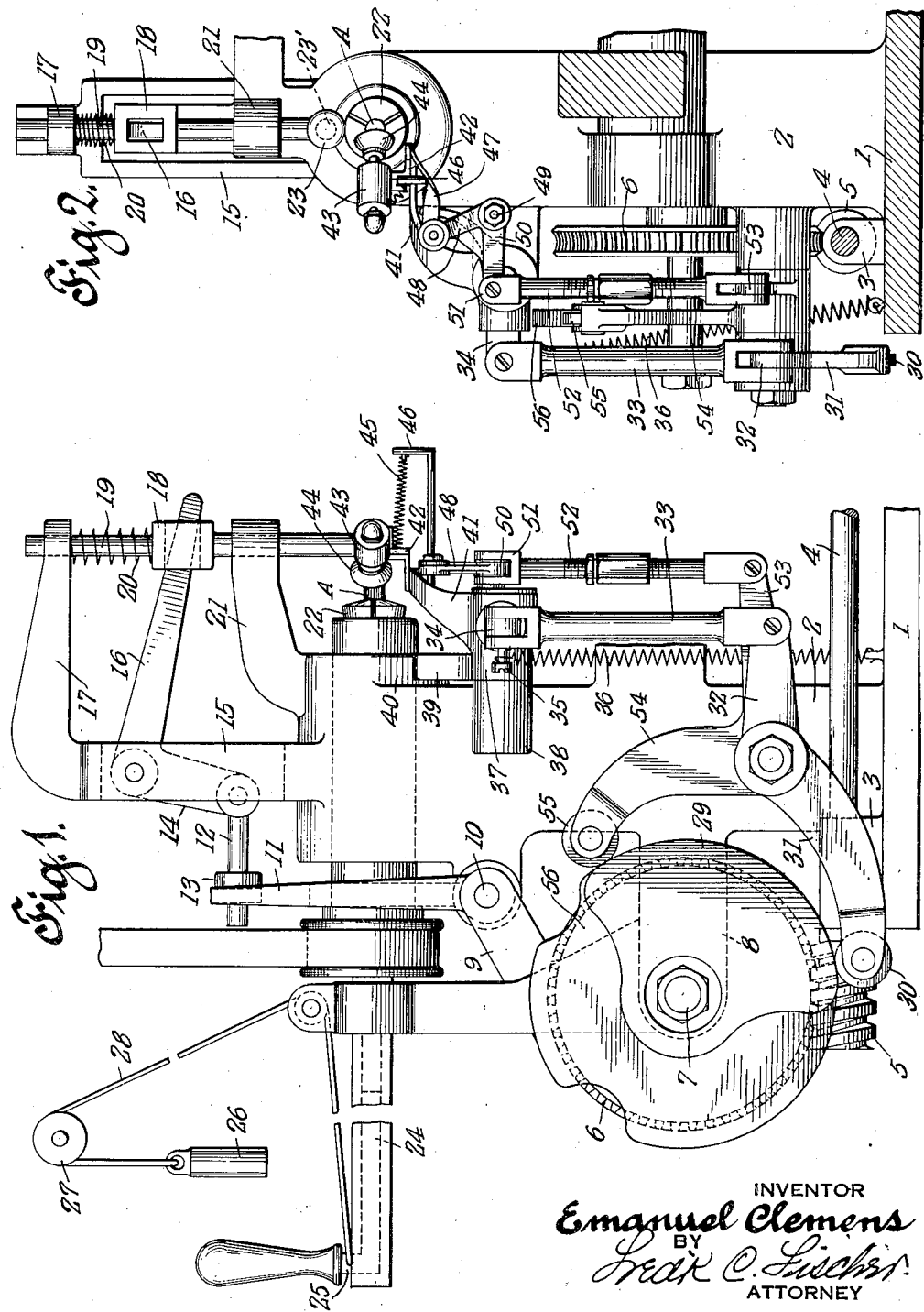
INVENTOR
Emanuel Clemens
BY
Fred C. Fischer
ATTORNEY Feb. 9, 1932.  E. CLEMENS  1,843,944
ATTACHMENT FOR BUTTON MAKING MACHINES
Filed June 3, 1930  2 Sheets-Sheet 2
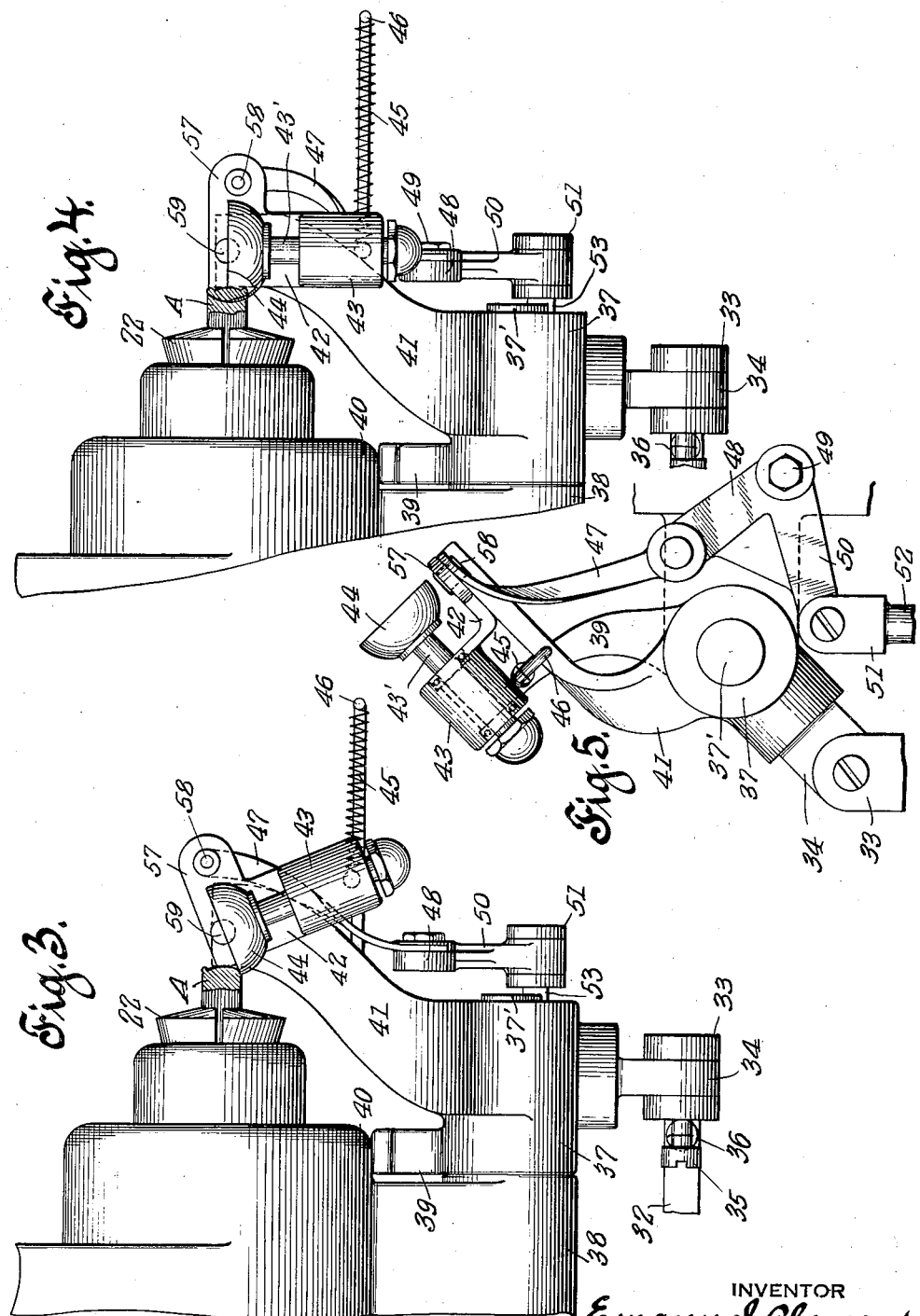
INVENTOR
Emanuel Clemens
BY
Fredk C. Fischer
ATTORNEY Patented Feb. 9, 1932

1,843,944

UNITED STATES PATENT OFFICE

EMANUEL CLEMENS, OF EAST ORANGE, NEW JERSEY

ATTACHMENT FOR BUTTON MAKING MACHINES

Application filed June 3, 1930. Serial No. 459,042. REISSUED

This invention relates to button making machines, and more particularly to a machine for making buttons from rods of casein products.

The use of casein products in the manufacture of buttons has become widespread, and in my application for U. S. Letters Patent, Serial No. 367,760, there is described a machine for making buttons from rods formed of such products.

Heretofore, it has been necessary to "cure" the rods before they were in condition for button making, the curing process usually requiring from three to four months. The time required for curing makes the use of the rods objectionable, in that a large stock of cured rods must be kept on hand in order to meet emergencies.

It has been found that buttons made from "uncured" casein product may be cured in three or four days, and it is an object of this invention to provide a machine for making buttons from uncured rods of a casein product.

A further object is the provision of a cutter for shaping the rear of a button and subsequently severing the button from the rod.

A further object is the provision of means for automatically controlling the positions and cutting actions of the cutter.

These and other advantageous objects are attained by the novel construction, combination and arrangement of parts hereinafter described and shown in the accompanying drawings, constituting a material part of this disclosure and in which:

Figure 1 represents a side elevational view of a button making machine embodying the invention.

Figure 2 represents a front elevational view of the machine.

Figure 3 represents a plan view of the cutter used in the machine.

Figure 4 represents a plan view of the cutter in a cutting position, and

Figure 5 represents a side elevational view of the cutter.

Referring to the drawings, in Figure 1, the machine is shown to include a base 1, with an upstanding main support 2. Journalled in a bearing 3 on the base is a shaft 4, driven by a source of power not shown.

The shaft 4 carries a worm 5 in mesh with a worm wheel 6, the latter being fixed to a shaft 7, journalled in a bearing 8 integral with the main support 2.

Mounted on shaft 7 is a cam (not shown) which engages arm 9, rotatably mounted on a shaft 10, journalled in a bearing on the support 2, the arm 9 being integral with an upstanding arm 11, the latter having an aperture at its extremity through which passes a rod 12, having a collar 13 engaged by the arm 11.

The arm 11 has a to and fro movement to actuate a bell crank 14, connected with rod 12 and rotatably mounted on an upstanding support 15. Arm 16 of the bell crank engages a block 18 fixed to a rod 19, the latter passing through a guide bracket 17, and normally urged downwardly by a compression spring 20 interposed between the block 18 and the bracket 17.

The rod 19 is also guided by a lower bracket 21, and the lower extremity of the rod is provided with a head 23, carrying a rotatable element 23' adapted to be periodically lowered into the path of a rod of a casein product A, to limit the longitudinal movement thereof when the latter is released in the chuck 22, and urged forwardly by the rod 24, having an upturned end 25, to which is connected a cable 28, which passes over a pulley 27 and is connected to a weight 26. The above structure is described in detail in my pending application, Serial No. 367,760.

Fixed to shaft 7 is a cam 29 engaged by a roller 30 mounted on an arm 31 of a rocker 32, which is pivotally connected to a vertical link 33, the latter being pivotally connected to an arm 34 of a rocker 37 rotatably mounted on a shaft 37' journalled in a bearing 38 integral with support 2.

Projecting from the upper end of link 33 is a pin 35 to which is connected a tension spring 36, the latter being also connected to the base 1, to constantly urge the arm 34 downwardly.

Upward movement of arm 34 is limited by the engagement of the stop 39 with the portion 40 of the support 2, the stop 39 being integral with the rocker 37.

The arm 41 of rocker 37 has pivoted thereto at 59, a small bracket 42 which supports a bearing 43 in which is journalled a stub shaft 43', the latter having fixed thereto a cup-shaped cutter 44. A tension spring 45 is connected to the opposite end of bearing 43 and to the upturned end of a rod 46, the latter being supported by the arm 41.

A lateral extension 57 of the bracket 42 is pivotally connected at 58 to a link 47, which is pivotally connected to the arm 48 of a bell crank rotatably mounted at 49 on the support 2.

The other arm 50 of the bell crank is pivotally connected to the spaced ears 51 integral with a vertical link 52, the latter being in turn pivotally connected to the arm 53 of a rocker having an arm 54 provided with a roller 55 in engagement with a cam disc 56 attached to shaft 7, the rocker being rotatably mounted on a stub shaft projecting from the main support 2.

In operation, the rod A is intermittently fed forward in the chuck 22 to present sections to be formed into buttons, the movement of the rod being limited by the block 23, which subsequently moves upwardly out of the path of a tool (not shown) for facing the button, the facing tool being clearly described in my application Serial No. 367,760, filed June 1, 1929.

As the rod is being fed forward, cam 29 acts upon arm 31 to cause arm 41 to move downwardly to bring the cutter 44 on a level with the rod as shown in Figure 3. During the downward movement of arm 41, cam 56 does not cause a change in the position of arms 48, 50 of the bell crank pivoted at 49, the link 47 being pivoted to arm 48, moves with extension 57; but as extension 57 moves downward, the pivot 58 is urged to describe an arc which gradually goes beyond the arc possible to be described with arm 47 rotating about its fixed pivot on arm 48, which at such time is stationary. Consequently, by way of compensation, arm 47 will pull on extension 57 to rotate bracket 42 about the pivot 59 against the action of spring 45 to bring the cutter 44 into a cutting position as shown in Figure 3.

When that position is reached, roller 55 on arm 54 falls into a notch in cam 56, and link 52 moves downwardly, causing link 47 to move in the same direction. Such movement of link 47 forces the cutter into engagement with the rotating rod A, the rotation of the rod causing the cutter to rotate.

The movement of link 47 continues until a button has been formed and severed from rod A by the cutter 44. The arm 41 moves upwardly and link 47 ceases to exert force on the bracket so that spring 45 promptly returns the bracket and cutter to a position so that it will not interfere with the advancing of the rod A in chuck 22.

As hereinbefore stated, the rod A is uncured and soft, and the cutting action of cutter 44 is easy and rapid. The cutting action may also be facilitated by oiling the cutter after each operation.

After the buttons have been cut from the rod A, they may be conveniently "cured" and hardened in three or four days.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a machine for making buttons from a rod of suitable material, a freely rotatable cup-shaped cutter for shaping the underside of a button and for severing the button from the rod, means for moving the cutter periodically into cutting engagement with the rod, and means for moving the cutter to an inoperative position after the completion of the severing operation.

2. In a machine for making buttons from a rod of suitable material, a freely rotatable cup-shaped cutter for shaping and severing a button from the rod, and means for moving the cutter periodically into cutting engagement with the rod.

3. In a machine for making buttons from a rod of suitable material, a support, an arm rotatably mounted on the support, a bracket pivoted on the arm, a bearing supported by the bracket, a stub shaft journalled in the bearing, a cup-shaped cutter fixed to the shaft, means to periodically move the arm to place the cutter in a position adjacent the rod, and means to rotate the bracket on the arm to urge the cutter into cutting engagement with the rod.

4. In a machine for making buttons from a rod of suitable material, a support, an arm rotatably mounted on the support, a bracket pivoted on the arm, a cup-shaped cutter rotatably mounted on the bracket, means to move the arm to place the cutter in a position adjacent the rod, and means to rotate the bracket to urge the cutter into cutting engagement with the rod.

5. In a machine for making buttons from a rod of suitable material, a cup-shaped cutter for shaping and severing a button from the rod, a bracket upon which the cutter is rotatably mounted, means for moving the bracket periodically vertically to a position adjacent the rod, means for rotating the bracket horizontally to urge the cutter into cutting engagement with the rod.

6. In a machine for making buttons from a rod of suitable material, a support, an arm rotatably mounted on the support, means for periodically moving the arm through a predetermined arc, a bracket rotatably mounted on the arm, a cup-shaped cutter rotatably mounted on the bracket, said cutter rotating in a plane transverse to the plane of rotation of the arm, and means to periodically rotate the bracket in a plane transverse to the planes of rotation of the cutter and arm.

7. In a machine for making buttons from a rod of suitable material, a support, an arm rotatably mounted on the support, means for periodically moving the arm through a predetermined arc, a bracket rotatably mounted on the arm, a cup-shaped cutter rotatably mounted on the bracket, and means to periodically rotate the bracket in a plane transverse to the plane of rotation of the arm.

This specification signed this 2nd day of June, 1930.

EMANUEL CLEMENS.